United States Patent Office 3,323,923
Patented June 6, 1967

3,323,923
METHOD OF DEHYDRATING A FOOD MATERIAL
Joseph V. Fiore, Fairfield, Conn., assignor to American Machine & Foundry Company, a corporation of New Jersey
No Drawing. Filed Feb. 15, 1963, Ser. No. 258,890
6 Claims. (Cl. 99—199)

This invention relates to the art of drying foams and more particularly to an improved method for the expeditious dehydration of foams to produce a product of superior quality.

Dehydration of foamed foods as a means of solving various problems associated with preservation, convenience, storage, transportation, etc. has been a recognized procedure for many years. The technique described in U.S. Patents 2,183,516 and 2,200,963 is illustrative. In more recent years, various methods have been described in such U.S. Patents as 2,934,441, 2,955,046, 2,955,943, 2,967,109, 2,976,158, 2,981,629 and 3,031,313.

It is the object of the present invention to improve the quality of foams used in conjunction with dehydration procedures of foamed material.

It is a more specific object of the invention to provide in the art of dehydrating foamed material, certain foam stabilizing agents which offer better characteristics in the foam as well as in the resulting product obtained from drying the foam.

Various additional objects of the invention will become apparent from the description which follows:

The invention will be described herein in connection with the drying of food foams but it will be apparent that the advantages of the invention may be applied in addition to the drying of non-food material as foam with the objective that the availability of such non-food material may offer advantages in a relatively dehydrated state.

Generally, in the method of dehydrating foamed food material, the procedure is followed wherein a suitable food concentrate is prepared in which a gas, usually air, is incorporated by whipping, resulting in a rather stiff foam. Conversion of the food into foam and the stability thereof is aided by the introduction of an edible foam stabilizer. The foam is then deposited as by casting or extrusion onto a drying surface and thereafter appropriately dried to an extent which may depend on the material but generally until a moisture level usually in the range of about 1 to 4% is reached. The dried foam may then be flaked or ground and where desirable may be compressed into pellets or other forms without significant loss of ready solubility in cold water.

The use of various surface active agents such as the monoglycerides of the higher fatty acids, for example, glycerol monolaurate, glycerol monomyristate, glycerol monopalmitate, glycerol monostearate and glycerol mono-oleate, as foam stabilizers in aqueous systems is known. As such, they have been used in the process known as foam mat drying though they are not limited to this application. These compounds can be used alone or in combination with a hydrophilic colloid, such as methylcellulose. These compounds described heretofore as useful for this purpose have the following generic formula:

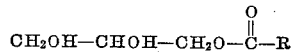

where R is the alkyl radical of a fatty acid and contains at least eleven carbon atoms (the Myverols of Distillation Products Industries examples are of these compounds). These compounds are disclosed in the U.S. patents hereinabove enumerated.

In accordance with the present invention, I have found a group of compounds, not heretofore known as useful for this purpose, which offers certain definite advantages in the stabilization of foams. The compounds contemplated by the invention are:

(1) Ester derivatives of the monoglycerides of the higher fatty acids;
(2) Polyglycerine; and
(3) Esters of polyglycerines.

Examples of the first group are those ester compounds having the following generic formula:

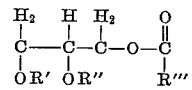

where R' and R" represent hydrogen or an organic ester substituent derived from mono- or poly-carboxylic acids containing up to 12 carbon atoms or from an inorganic acid and R''' is an alkyl substituent having at least eleven carbon atoms.

The ester groups referred to above may be derived from the mono-carboxylic acids such as acetic, etc., or the polycarboxylic acids such as tartaric, etc. Examples of this class of compounds include for example: the acetyl, propionyl, butyryl or caproyl, etc., derivatives of glycerol monolaurate or glycerol monomyristate or glycerol monopalmitate or glycerol monostearate or glycerol mono-oleate etc.; the ester derivatives of oxalic, malonic, succinic, glutaric, tartaric, citric, malic, maleic or oxalacetic etc. acids and glycerol monolaurate or glycerol monomyristate or glycerol monopalmitate or glycerol monostearate or glycerol mono-oleate etc.; and the sulfuric or phosphoric etc. acid esters of glycerol monolaurate, glycerol monomyristate or glycerol monopalmitate or glycerol monostearate or glycerol mono-oleate etc. An especially suitable compound in stabilizing food foams and in producing an excellent product of fine taste in the diacetyl tartaric acid ester of glycerol monostearate available commercially, for example, as Emcol D–66–1 from Witco Chemical Company.

Examples of the polyglycerine compounds of the second group are such as: diglycerine, triglycerine, tetraglycerine, etc., which are included in the term polyglycerine, i.e. glycerine polymers which are produced in a manner as described in U.S. Patent Nos. 2,022,766 and 2,023,388 by the alkaline polymerization of glycerine under suitable conditions. It will be understood that a polyglycerine in mixtures of this kind is not a single compound but a mixture of compounds. It is further understood that any polymeric glycerine isolated and purified from such a mixture would also be included in the term polyglycerine as used herein.

Compounds of the third group useful as stabilizers in accordance to the invention are the esters of polyglycerine which include those derived from mono-or polycarboxylic acids as well as those from inorganic acids or mixtures of one or more of the aforementioned acids. Examples of this class of compounds include: the organic acid esters of polyglycerine such as the acetic, butyric, lauric, stearic, oleic, tartaric or citric acid esters of polyglycerine; the inorganic acid esters of polyglycerine such as the sulfuric or phosphoric etc. acid esters of polyglycerine and the like. Especially preferred are the higher fatty acid ester derivatives of polyglycerine. In particular, I have found that polyglycerine stearate prepared in a manner similar to that described in U.S. Patent Nos. 2,022,766 and 2,023,-388 and available commercially, for example, from Witco Chemical Companying as Emcol 18, works excellently as a foam stabilizer to produce a foam and product therefrom of exceptionally advantageous characteristics. A large variety of esters may be synthesized. In many respects they resemble fats (e.g. monoglycerides) but are distinguished therefrom in being long chain molecules. These compounds have superior wetting, emulsifying and other capillary active properties. In addition, they possess better taste qualities unlike the result to be expected from the regular fats or monoglycerides. It is believed that this is due to the "plastic" nature of the longer chain length.

Although the compounds described in the present invention are specifically applied to foam layer drying, they are not necessarily limited to drying of materials as foam.

In utilizing the compounds in the preparation of foam material to be dehydrated in accordance with the invention, a liquid concentrate of the material to be dehydrated is first diluted or concentrated, depending on the material, to a fairly viscous condition and converted into a stable foam by incorporating therewith a minor proportion of the foam stabilizing agent of the type described above together with a substantial volume of air or other gas. The foam so produced is then exposed to heat in the form of a relatively thin layer until it is dry.

The advantages in the technique of drying material in the foam condition include, for example, rapid processing by increasing the surface area of the liquid concentrate thereby facilitating dehydration and production of a dehydrated product of high porosity such as is obtained in freeze-drying, "puff"-drying, etc. It is apparent that the greater the foam stability, especially under the high temperature conditions of dehydration, the better these purposes will be achieved.

In practice, foams made with the improved stabilizing agents described in conjunction with the invention offer the following advantages over the various stabilizing agents, including the monoglycerides which have been employed for this purpose heretofore:

(1) Less collapse on the drying belt, tray or other support, during heating and drying; this results in (a) increased drying rates,
(b) easier scraping of the dried product from the support, and
(c) higher porosity products which therefore have greater solubility.

(2) Greater ease of incorporation into the food material to be foamed and subsequently dehydrated. The monoglycerides, previously recommended for use in foam mat drying, have critical "gelatin" characteristics which preclude their direct addition to food materials to be whipped at room temperature or below. As illustrated in the subsequent example(s) this problem does not exist with the group of materials designated by the present invention.

(3) Flavor and taste advantages.

The proportion of foam stabilizing agent introduced into the liquid containing the material to be dried may vary over fairly wide limits and may depend on various conditions, for example, the properties of the liquid, the nature of the material to be foamed, etc. In general, the proportion of agents may vary from about 0.01% to about 10% by weight based on the weight of solids in the liquid subjected to foaming. Ordinarily, amounts of from about 0.05% to about 8% are adequate. Normally it is desirable to use the lowest proportion of foam stabilizing agent compatible with the production of a foam stable at room temperature for a minimum of two hours. In any particular case, pilot runs may be readily conducted with different proportions of a given agent in a given liquid, noting the stability of the foam by casting a small quantity of the foam on a drying conveyor belt and conveying it through the drying zone at dehydration temperatures. A suitably stable foam will substantially retain its height throughout the drying stage.

Further advantages which are derived from use of the foam stabilizers claimed herein will become obvious from the examples which follow.

EXAMPLE 1

This example demonstrates the ease with which the compounds claimed herein can be used. For example, no special techniques are required to disperse polyglycerine stearate (Emcol 18) and to form stable emulsions therewith as contrasted to the monoglycerides which frequently require the preparation of a "pony" or intermediate premix into which the stabilizer is first dispersed prior to introduction into the general mass to be dehydrated.

Polyglycerine stearate, Emcol 18, is powdered by grinding and added slowly to boiling water contained in a high speed mixer, a Cowles Mixer or Waring Blendor. The boiling water is stirred while sufficient powdered material is added so as to yield a 3 to 5% aqueous solution by weight. Mixing is then carried out until a consistency similar to shaving cream is obtained. The emulsions thus formed are extremely stable and can be stored under refrigeration for several weeks without separation.

These emulsions are added directly to the four materials to be foamed, tomato paste, tomato juice, orange juice and tea concentrate. The foam obtained is extremely stable and insensitive to over-whipping. Table I lists materials foamed with the preferred representatives of both classes of compounds claimed herein. The foams were prepared in a Kitchen Aid Mixer using emulsions obtained as described for Emcol 18 above.

TABLE I

| Material Foamed | | Percent Foaming Agent (based on food solids) | Emcol 18 [1] | | Emcol D-66-1 [1] | |
|---|---|---|---|---|---|---|
| Type | Percent Solids (dry basis) | | Foam Density (g./cc.) | Time Req.[2] (min.) | Foam Density (g./cc.) | Time Req.[2] (min.) |
| Tomato Paste | 30 | 0.75 | 0.52 | 20 | 0.52 | 20 |
| Tomato Juice | 25 | 0.50 | 0.36 | 25 | 0.37 | 11 |
| Orange Juice | 60 | 0.50 | 0.20 | 7 | 0.35 | 15 |
| Tea Concentrate | 54 | 1.00 | 0.25 | 15 | | |

[1] All foams were stable over 60 min.
[2] For the desired foam density.

EXAMPLE 2

In addition to their use in batch foaming operations as described in the previous example, the foaming agents claimed in this invention can be used as illustrated in accordance with this example in continuous foaming operations. It is also understood that the emulsions themselves can be prepared in a continuous manner if desired.

Polyglycerine stearate, for example, has been found very effective in continuous foaming using commercial foaming machines such as Model No. 68-31, American Machine & Foundry Company Mixer, wherein gas under pressure is whipped into the food material by the use of a high shear rotor revolving in a pressurized mixing head. Using two such machines, typical results with tomato paste were achieved under the following operating conditions employing emulsions prepared as described in Example 1 in a continuous mix system with the tomato paste.

| | Oakes Mixer (Model 4MBH) | AMF Mixer (Model 68-31) |
|---|---|---|
| Feed Rate | 36 lbs./hr. | 1,500 lbs./hr. |
| Air Flow | 40 cc./min. | 0.4 cu. ft./min. |
| Head Pressure | 80 p.s.i.g. | 55 p.s.i.g. |
| Rotor Speed | 900 r.p.m. | 300 r.p.m. |
| Polyglycerine Stearate Conc. (based on food solids) | 0.75% | 0.75%. |
| Foam Density | 0.50-0.51 g./cc. | 0.45-0.46 g./cc. |
| Foam Stability | >1 hr. | >1 hr. |

Passage of tomato paste through these machines without the foam stabilizer results in essentially no foaming.

EXAMPLE 3

Tomato paste (30% solids, dry basis) was whipped with various foam stabilizers and dried in thin layers on a moving belt applying heat to the undersurface of the belt at 195°F. and passing high velocity heated air at 175°F. over the belt as described in the copending application of R.J. Osborne et al., entitled "Drying Process and Apparatus," filed on even date herewith. Under the same drying conditions and foam densities, the agents claimed herein yielded substantially higher drying rates and better dried product flavor than the other types of foam stabilizers tested. Typical results are listed in Table II. "Foreign" flavor indicates non-acceptability of the product due to off taste or odors; "good" indicates acceptable properties in this respect.

TABLE II

| Foaming Agent | Percent Foaming Agent (based on tomato paste solids) | Drying Rate (lbs./hr./ft.² of drying surface) | Foam Layer Thickness (mils) | Overall Flavor |
|---|---|---|---|---|
| Myverol 18-00 [1] (batch foaming) | 0.75 | 0.60 | 30 | Foreign Flavor. |
| Methocel 65HG, 4,000 cps.[2] + Gunther D-100 [3] (1/1 by wt.) (batch foaming) | 2.0 | 0.35 | 30 | Do. |
| Methocel 65HG, 4,000 cps.[2] + Methocel Mc, 10 cps.[2] (⅓ by wt.) (batch foaming) | 1.8 | 0.30 | 30 | Do. |
| Emcol 18 [4] (batch foaming) | 0.75 | 0.82 | 25 | Good. |
| Emcol 18 [4] (continuous foaming) | 0.75 | 1.0 | 25 | Do. |
| Emcol D-66-1 [5] (batch foaming) | 0.75 | 2.0 | 15 | Do. |

[1] Monoglycerides, Distillation Products Industries, Div. of Eastman Kodak Co.
[2] Methyl cellulose, Dow Chemical Co.
[3] Soybean vegetable protein, Gunther Products.
[4] Polyglycerine stearate of Witco Chemical Co.
[5] Diacetyl tartaric acid ester of glycerol monostearate of Witco Chemical Co.

EXAMPLE 4

Polyglycerine prepared in accordance with Example 4 of U.S. Patent 2,023,388, was added to tomato paste 30% solids at a level of 1.0% based on tomato solids. The mixture was whipped in a vertical beater with a wire beater for 10 minutes. The resulting foam of 0.52 gm./cc. density was cast on a stainless steel belt in a layer thickness of 25 mils and dried as described in the procedure of Example 3 using a belt temperature of 195°F. and air temperature over the belt of 175°F. The drying rate was 1.2 lbs./hr. per sq. ft. of drying surface. The product had good solubility and reconstitution properties and had good flavor, aroma and color.

It will be apparent to those skilled in the art that various modifications may be made in the invention without departing from the scope of the invention. Accordingly, the invention is not to be limited except insofar as necessitated by the appended claims.

I claim:

1. In the method of dehydrating a food material which includes the steps of preparing a foam of said material aided by incorporating with said material, a foam stabilizing agent, the improvement which comprises using as the foam stabilizing agent from about 0.05% to about 8% of a foam stabilizer selected from the group consisting of (a) ester derivatives of the monoglycerides of the higher fatty acids having the formula

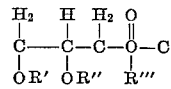

wherein R' and R'' represents material selected from the group consisting of hydrogen, acyl groups derived from carboxylic acids containing up to 12 carbon atoms, and acid groups from an inorganic acid, R' and R'' not being simultaneously hydrogen, and R''' represents an alkyl substituent having at least 11 carbon atoms, (b) polyglycerines and (c) esters of polyglycerines.

2. In the method of dehydrating a food material which includes the steps of preparing a foam of said material aided by incorporating with said material, a foam stabilizing agent, the improvement which comprises using as the foam stabilizing agent from about 0.05% to about 8% of an ester derivative of the monoglycerides of the higher fatty acids having the formula

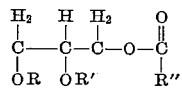

wherein R' and R'' represents material selected from the group consisting of hydrogen, acyl groups derived from carboxylic acids containing up to 12 carbon atoms, and acid groups from an inorganic acid, R' and R'' not being simultaneously hydrogen, and R''' represents an alkyl substituent having at least 11 carbon atoms.

3. In the method of dehydrating a food material which includes the steps of preparing a foam of said material aided by incorporating with said material, a foam stabilizing agent, the improvement which comprises using as the foam stabilizing agent from about 0.05% to about 8% of a polyglycerine.

4. In the method of dehydrating a food material which includes the steps of preparing a foam of said material aided by incorporating with said material, a foam stabilizing agent, the improvement which comprises using as the foam stabilizing agent from about 0.05% to about 8% esters of polyglycerines.

5. In the method of dehydrating a food material which includes the steps of preparing a foam of said material aided by incorporating with said material, a foam stabilizing agent, the improvement which comprises using as the foam stabilizing agent from about 0.05% to about 8% polyglycerine stearate.

6. In the method of dehydrating a food material which includes the steps of preparing a foam of said material aided by incorporating with said material, a foam stabilizing agent, the improvement which comprises using the foam stabilizing agent from about 0.05% to about 8% of the diacetyl tartaric acid ester of glycerol monostearate.

References Cited

UNITED STATES PATENTS 2,976,158   3/1961   Morgan et al. _____ 99—199

A. LOUIS MONACELL, *Primary Examiner.*

R. S. AULL, H. LORD, *Assistant Examiners.*